United States Patent Office 3,458,622
Patented July 29, 1969

3,458,622
CONTROLLED RELEASE TABLET
John A. Hill, New Brunswick, N.J., assignor to E. R. Squibb & Sons, Inc., New York, N.Y., a corporation of Delaware
No Drawing. Filed Apr. 7, 1967, Ser. No. 629,066
Int. Cl. A61k *27/12*
U.S. Cl. 424—19      4 Claims

ABSTRACT OF THE DISCLOSURE

This invention relates to tablets for medicinal agents in which the active substance is released at a controlled rate up to about 8 hours. The material which is incorporated into the compressed tablet to control the release rate, comprises a blend of a polymeric vinyl pyrrolidone with a carboxy vinyl hydrophilic polymer. The medicament and polymer blend are admixed in dry form, granulated by a wet granulation method and then compressed to form tablets.

---

This invention relates to medicinal agents in tablet form in which the physiologically active material is released at a predetermined rate. The system is designed so that there is a comparatively rapid release during about the first hour after ingestion and then there is a retarded uniform release rate over the subsequent time period for a total time of approximately eight hours. A relatively uniform therapeutic blood level of the active material is thereby maintained for that period.

The material which controls the release of medicament, according to this invention, comprises a blend of polymeric vinyl pyrrolidone together with a carboxy vinyl hydrophilic polymer. The medicament is admixed with the dry polymeric substances and the blend is then granulated, dried and compressed into tablet form.

When the resulting tablet is placed in water or gastric fluid, the two polymeric substances react to form a complex of low solubility which is gum like in consistency and the reaction mass thus alters and retards the diffusion of the active material from the tablet. There is practically no swelling of the polymer complex as differentiated from the usual behavior of a hydrophilic colloid. Since initially this reaction is only a surface effect and there is relatively little of the restraining substance, the active material near the surface is allowed to diffuse out of the tablet fairly rapidly. As the moisture penetration becomes deeper, the restraining matrix becomes thicker and reduces the diffusion rate of the active substance. When the tablet is transferred to intestinal fluid, however, the entire matrix is then eroded, thus providing a different order of release pattern since both erosion and diffusion are taking place.

While polymers, gums and hydrocolloids have been proposed for the preparation of sustained dosage tablets, the ratio of the restraining material to active ingredient has been much greater and this places a greater limit or restriction on the quantity of medicament which can be utilized in a single convenient size tablet. In addition, these former systems approximate a zero or first order release pattern rather than a dual release pattern as the tablets of this invention provide.

The vinyl polymer which constitutes one member of the blend is polyvinyl pyrrolidone (Merck Index, 7th ed., 1960, page 834), e.g., having a molecular weight of about 5000 to 80,000, preferably about 40,000.

The second component of the polymer blend is a carboxypolymethylene hydrocolloid polymer of the type described in United States Patent 2,909,462, issued Oct. 10, 1959, being a polymer of acrylic acid cross linked with polyallyl sucrose [marketed under the trade name Carbopol, with designations 934, 940, 941 (B. F. Goodrich Chemical Co.)].

The proportions, by weight, of the two polymeric substances used in the blend, i.e., the ratio (by weight) of the vinyl polymer to carboxypolymethylene polymer is about 1:10 to 10:1. Preferably, however, they are used in a ratio of about 1:1 by weight.

The ratio of carboxy vinyl polymer to the drug is less than 0.5:1. That is, the ratio (by weight) of the polymeric substance to weight of drug is about 0.1 to 0.45:1. The combined weight of the two polymeric materials may, of course, exceed half the weight of active medicament but should preferably be kept below about 75% of the active drug. Tablets up to about 1.0 gm. in weight may be prepared.

The tabletting procedure may follow the conventional wet granulation technique. The active substance, the vinyl polymer and carboxypolymethylene polymer are blended in the dry form, for example, in a planetary mixer. While mixing, the powders are wetted with a granulating liquid containing binders such as ethyl cellulose, zein, gelatin, shellac, other cellulose esters, ethers or the like and/or plasticizer such as triethyl citrate, acetyl tributyl citrate, acetyl triethyl citrate, dibutyl phthalate, or the like. For highly water soluble materials, granulating fluids such as methylene chloride, chloroform, methyl chloroform, ethyl alcohol, specially denatured ethyl alcohol, isopropyl alcohol or combinations thereof may be used to achieve the desired degree of wetness. For materials having low water solubility, aqueous, alcoholic or hydro-alcoholic granulating fluids may be employed.

The moist mass is granulated, e.g., by forcing through a screen of suitable mesh size and then allowed to air dry. The dried particles may be further reduced in size if desired. Other conventional granulating and size reduction techniques such as use of a suitable comminuter may also be employed if so desired.

Lubricants are added to the dried granulate, stearic acid, palmitic acid, magnesium stearate, mineral oil, sodium stearate, calcium stearate, talc, or the like, and the tablet mixture is compressed in conventional manner. A tablet press fitted with suitably sized punches and dies are used to provide a tablet of any desired weight, shape and composition.

Additional control over the rate of water penetration into the tablets may be achieved by adding to the blend about 0.5 to 10% by weight (based on tablet weight) of a non yellowing resinous terpene polymer, e.g., $\beta$-pinene resin having a melting point in the range of about 85 to 115° C. (marketed under the trade name Piccolyte by Pennsylvania Industrial Chemical Corp.).

A wide variety of medicaments which are orally administered in tablet form may utilize the tablets prepared according to this invention. These include, for example, adrenergic agents such as ephedrine, desoxyephedrine, phenylephrine, epinephrine and the like, cholinergic agents such as physostigmine, neostigmine and the like, antispasmodic agents such as atrophine, methantheline, papaverine and the like, curariform agents such as chlorisondamine and the like, tranquilizers and muscle relaxants such as fluphenazine, chlorpromazine, trifluromazine, mephenesin, meprobamate and the like, antihistamines such as diphenhydramine, dimenhydrinate, tripelennamine, perphenazine, chlorprophenazine, chlorprophenpyridamine and the like, hypotensive agents such as rauwolfia, resperpine and the like, cardioactive agents such as benzydroflumethiazide, flumethiazide, chlorothiazide, aminotrate, procainamide and the like, steroids such as testosterone, prednisolone and the like, antibacterial agents, e.g., sulfonamides such as sulfadiazine, sulfamerazine, sulfamethazine, sulfisoxazole and he like, antimalarials such as chloroquine and the like, antibiotics such as the tetracyclines, nystatin, streptomycin, penicillin, griseofulvin and the like, sedatives such as chloral hydrate, phenobarbital and other barbiturates, glutethimide, antitubercular agents such as isoniazid and the like, analgesics such as aspirin, meperidine and the like, etc. These substances are frequently employed either as the free compound or in a salt form. Other therapeutic agents having the same or different physiological activity as those recited above can obviously be employed in pharmaceutical preparations within the scope of the present invention.

The following examples are illustrative of the invention.

Example 1

The following ingredients are used:

|  | Per tablet (mg.) | Per batch 600 tablets (gm.) |
| --- | --- | --- |
| Polyvinyl Pyrrolidone K-30 | 185.0 | 111.0 |
| Carbopol 934 | 185.0 | 111.0 |
| Procaine amide hydrochloride, micropulverized | 500.0 | 300.0 |
| Ethyl cellulose | 15.0 | 9.0 |
| Triethyl citrate | 7.5 | 4.5 |
| Piccolyte resin Type S-115-L | 12.5 | 7.5 |
| Stearic acid | 9.0 | 5.4 |
| Magnesium stearate | 2.27 | 1.36 |
| Total | 916.27 | 549.76 |

The procainamide hydrochloride, polyvinyl pyrrolidone and Carbopol are admixed in a planetary type mixer. While mixing, the powders are wet with 150 ml. of a 6% w./v. solution of ethyl cellulose also containing 3% w./v. of triethyl citrate and 5% w./v. of Piccolyte resin in methylene chloride solvent. The moist mass is granulated by forcing through a No. 16 mesh screen and allowed to air dry. After drying the powder is passed through a No. 20 mesh screen. To the dried granulate is added the Stearic Acid and magnesium stearate, and mixed by tumbling.

Example 2

|  | Per tablet (mg.) | Per batch 600 tablets (gm.) |
| --- | --- | --- |
| Procainamide hydrochloride, micropulverized | 500.0 | 300.0 |
| Polyvinyl Pyrrolidone K-30 | 158.3 | 95.0 |
| Carbopol 934 | 158.3 | 95.0 |
| Ethyl cellulose | 25.0 | 15.0 |
| Magnesium stearate | 8.4 | 5.05 |
|  | 850.0 | 510.05 |

The procainamide hydrochloride, polyvinyl pyrrolidone and Carbopol are admixed in a planetary type mixer. While mixing, the powder is wet with 150 ml. of a 10% solution of ethyl cellulose in methylene chloride.

The moist mass is then granulated, dried and mixed with lubricant and compressed as in Example 1.

Example 3

The following ingredients are tabletted according to the procedure of Example 1:

|  | Per tablet (mg.) | Per batch 600 tablets (gm.) |
| --- | --- | --- |
| Procainamide hydrochloride, micropulverized | 500.0 | 300.0 |
| Polyvinyl Pyrrolidone K-30 | 158.4 | 95.0 |
| Carbopol 934 | 158.4 | 95.0 |
| Ethyl cellulose | 15.0 | 9.0 |
| Triethyl citrate | 7.5 | 4.5 |
| Magnesium stearate | 8.5 | 5.04 |
| Total | 847.8 | 508.54 |

Example 4

The following ingredients are tabletted as described below:

|  | Per tablet (mg.) | Per batch 600 tablets (gm.) |
| --- | --- | --- |
| Quinidine sulfate U.S.P. micropulverized | 300.0 | 180.0 |
| Polyvinyl Pyrrolidone K-30 | 132.0 | 79.20 |
| Carbopol 934 | 88.0 | 52.80 |
| Ethyl cellulose | 9.0 | 5.4 |
| Triethyl citrate | 4.5 | 2.7 |
| Piccolyte S-115-L | 7.5 | 4.5 |
| Stearic acid | 5.5 | 3.3 |
| Magnesium stearate | 1.5 | 0.90 |
| Total | 548.00 | 328.8 |

The quinidine sulfate, polyvinyl pyrrolidone and Carbopol are admixed in a planetary type mixer. While mixing, the powder is wetted with 90 ml. of a 6% w./v. solution of ethyl cellulose also containing 3% w./v. of triethyl citrate and 5% w./v. of Piccolyte in methylene chloride solvent. Additional triethyl citrate is added to achieve the desired level of wetness. The moist mass is forced through a No. 16 fine wire screen and allowed to air dry. After drying the material is passed through a No. 20 mesh screen. To the dried granulate are added the stearic acid and magnesium stearate and mixed by tumbling.

The powder is compressed in a tablet press, fitted with suitably sized and shaped punches and dies.

Example 5

The following ingredients are tabletted according to the procedure of Example 1:

|  | Per tablet (mg.) | Per batch 600 tablets (gm.) |
| --- | --- | --- |
| Tetracycline Hydrochloride | 500.0 | 300.0 |
| Polyvinyl Pyrrolidone K-30 | 222.0 | 133.2 |
| Carbopol 934 | 148.0 | 88.8 |
| Ethyl cellulose | 15.0 | 9.0 |
| Triethyl citrate | 7.5 | 4.5 |
| Piccolyte type S-115-L | 12.5 | 7.5 |
| Stearic acid | 9.0 | 5.4 |
| Magnesium stearate | 2.0 | 1.2 |

Example 6

The following ingredients are used:

(A) Preparation of granulation:

|  | Gm. |
| --- | --- |
| Aspirin powder fluffy | 500.0 |
| Carbopol 934 | 80.0 |
| Polyvinyl pyrrolidone K-30 | 120.0 |
| Total | 700.0 |

The dry power is mixed in a small planetary type mixer of the Hobart type, operated at slow speed. 250 ml. of distilled water are added and mixed thoroughly. This is granulated by passage through a No. 4 screen and allowed to air dry about 2 hours, then reduced in size by passage through a No. 14 screen and allowed to air dry overnight.

(B) Final mixture for tablet compression:

| Aspirin level | percent | 70.52 |
| --- | --- | --- |
| Aspirin granulation from A (equivalent to 499.81 gm. aspirin) | gm | 700.00 |
| Stearic acid powder | gm | 7.00 |
| Magnesium stearate | gm | 1.75 |
| Total | gm | 708.75 |

The aspirin granulation from part A is placed in a small Hobart type mixer and the stearic acid powder and magnesium stearate added by screening through a No. 40 mesh screen. This is mixed at slow speed for 5 minutes.

The mixture is compressed at 645 mg. weight, which is equivalent to 455 mg. of aspirin (7 grains).

The release rate of the active ingredient may be determined by the procedure of Souder et al., Drug Standards 26, 77–83, 1958, and are shown below for the compositions of Examples 1 to 3. The tablets in the examples are evaluated by this procedure utilizing two tablets of each composition and 80 ml. of Simulated Gastric Fluid U.S.P. XII and Simulated Intestinal Fluid U.S.P. XII.

Elution schedule (a) 1 hour in simulated gastric fluid.
(b) 1 hour in simulated gastric fluid followed by 1 hour in simulated intestinal fluid.
(c) 1 hour in simulated gastric fluid followed by 3 hours in simulated intestinal fluid.
(d) 1 hour in simulated gastric fluid followed by 7 hours in simulated intestinal fluid.

At the end of each of these time periods, the tablet residues are collected and dried. The dried residues are then assayed for their residual procainamide hydrochloride content, and the released procainamide hydrochloride calculated by difference from the respective initial values.

The respective release data obtained is tabulated in the following.

FORMULATION OF EXAMPLE 1

[Theoretical procainamide content=500 mg./tablet]

| Time period | Mg. procainamide assay residual | Mg. procainamide corrected to 500 mg. | Mg. procainamide released | Percent of total procainamide released |
|---|---|---|---|---|
| Initial | 494.6 | 500.0 | | |
| 1 hr. GF | 331.4 | 335.0 | 165.0 | 33.0 |
| 1 hr. GF and 1 hr. IF | 299.4 | 302.7 | 197.3 | 39.5 |
| 1 hr. GF and 3 hr. IF | 233.9 | 236.5 | 263.5 | 52.7 |
| 1 hr. GF and 7 hr. IF | 115.4 | 116.7 | 383.3 | 76.7 |

FORMULATION OF EXAMPLE 2

[Theoretical procainamide content=500 mg./tablet]

| Time period | Mg. procainamide assay residual | Mg. procainamide corrected to 500 mg. | Mg. procainamide released | Percent of total procainamide released |
|---|---|---|---|---|
| Initial | 500.7 | 500.0 | | |
| 1 hr. GF | 322.2 | 321.8 | 178.2 | 35.64 |
| 1 hr. GF and 1 hr. IF | 319.7 | 319.25 | 180.75 | 36.15 |
| 1 hr. GF and 3 hr. IF | 229.9 | 229.6 | 270.4 | 54.08 |
| 1 hr. GF and 7 hr. IF | 100.5 | 100.36 | 399.64 | 79.93 |

FORMULATION OF EXAMPLE 3

[Procainamide content=500 mg./tablet]

| Time period | Mg. procainamide assay residual | Mg. procainamide corrected to 500 mg. | Mg. procainamide released | Percent of total procainamide released |
|---|---|---|---|---|
| Initial | 494.4 | 500.0 | | |
| 1 hr. GF | 318.7 | 322.3 | 177.7 | 35.54 |
| 1 hr. GF and 1 hr. IF | 302.4 | 305.8 | 194.2 | 38.84 |
| 1 hr. GF and 3 hr. IF | 213.6 | 216.0 | 284.0 | 56.80 |
| 1 hr. GF and 7 hr. IF | 101.5 | 102.6 | 397.4 | 79.48 |

The data expressed as percent of total Procainamide released (Column 5) indicates the following release rate pattern in Example 1, for instance, on a per hour basis.

| Hour sequence: | Percent of total procainamide released |
|---|---|
| 1 | 33 |
| 2 | 6.5 |
| 3 | 6.5 |
| 4 | 6.5 |
| 5 | 6.0 |
| 6 | 6.0 |
| 7 | 6.0 |
| 8 | 6.0 |

With this type of release pattern, an immediate loading dose of procainamide equivalent to one third of the total active drug is provided within the first hour. For the subsequent time periods, i.e., up to eight hours, a uniform dostage level in the order of 6 to 6.5% of the total quantity of procainamide is provided on a per hour basis.

What is claimed is:

1. A controlled release medicinal tablet comprising a granulate of (a) an effective amount of medicament which is at least about 50% of the total tablet weight, (b) polyvinyl pyrrolidone and (c) a carboxyvinyl hydrophilic polymer of acrylic acid cross-linked with polyalkenyl polyether wherein the ratio by weight of (b) to (c) is about 1:10 to 10:1, the ratio by weight of (c) to (a) is about 0.1 to 0.45:1 and less than 0.5:1, and the combined weight of (b) and (c) is below about 75% of the weight of (a), the substance controlling the release rate of the medicament being the reaction product of (b) and (c).

2. A composition as in claim 1 wherein (c) is a polymer of acrylic acid cross-linked with polyallyl sucrose.

3. A composition as in claim 2 wherein the weight ratio of polymers is about 1:1.

4. A composition as in claim 1 wherein (a), the active medicament is about 500 mg. of procainamide, (b) the amount of polyvinyl pyrrolidone is about 185 mg. and (c) the amount of carboxyvinyl polymer is about 185 mg.

References Cited

UNITED STATES PATENTS

| | | | |
|---|---|---|---|
| 3,065,143 | 11/1962 | Christenson et al. | 167—82 |
| 3,074,852 | 1/1963 | Myron | 167—82 |
| 3,096,248 | 7/1963 | Rudzki | 167—82 |
| 3,158,538 | 11/1964 | Lee | 167—55 |
| 3,328,256 | 6/1967 | Gaunt | 167—82 |
| 3,330,729 | 7/1967 | Johnson | 167—82 |
| 3,346,449 | 10/1967 | Magid | 167—55 |
| 3,362,881 | 1/1968 | Eberhardt et al. | 167—82 |

SHEP K. ROSE, Primary Examiner

U.S. Cl. X.R.

424—22